United States Patent
Kalpaxis

[11] Patent Number: 5,622,518
[45] Date of Patent: Apr. 22, 1997

[54] BOOSTER CABLE SYSTEM

[76] Inventor: Arion A. Kalpaxis, 61-17 68th Ave., Ridgewood, N.Y. 11385

[21] Appl. No.: 561,815

[22] Filed: Nov. 22, 1995

[51] Int. Cl.$^6$ .................................................. H01R 11/00
[52] U.S. Cl. .................................................. 439/504
[58] Field of Search .................................. 439/504, 490; 320/2, 25, 26

[56] References Cited

U.S. PATENT DOCUMENTS

| | | | |
|---|---|---|---|
| 4,488,147 | 12/1984 | Signorile | 439/504 X |
| 4,869,688 | 9/1989 | Merio | 439/504 OR |
| 5,230,637 | 7/1993 | Weber | 439/504 OR |
| 5,438,251 | 8/1995 | Chen et al. | 439/504 OR |

*Primary Examiner*—P. Austin Bradley
*Assistant Examiner*—Daniel Wittels
*Attorney, Agent, or Firm*—Kriegsman & Kriegsman

[57] ABSTRACT

A booster cable system is provided for use in starting an automotive vehicle having a discharged battery with a charged battery, each battery having a positive terminal and a negative terminal. The booster cable system includes a first electrical cable having a first end for connection to the positive terminal of the charged battery and a second end, a second electrical cable having a first end for connection to the positive terminal of the discharged battery and a second end, a third electrical cable having a first end for connection to the negative terminal of the charged battery and a second end, and a fourth electrical cable having a first end for connection to the negative terminal of the discharged battery or a ground in the vehicle having the discharged battery and a second end. The four electrical cables are insulated. The booster cable system further includes an electrical switch coupled to said four electrical cables. The electrical switch when closed electrically connects the second end of the first electrical cable to the second end of the second electrical cable and electrically connects the second end of the third electrical cable to the second end of the fourth electrical cable. The booster cable system further includes an electrical clip on the first end of each one of the first, second, third and fourth electrical cables for removably securing the first end of each cable at its intended location. The booster cable system further includes first and second signal indicator circuits which visually indicate by green and red light emitting diodes the state of the connections made from the booster cable system to the charged battery, the discharged battery, and a ground.

10 Claims, 1 Drawing Sheet

BOOSTER CABLE SYSTEM

BACKGROUND OF THE INVENTION

The present invention relates generally to booster cables and more specifically to a booster cable system for use in starting an automotive vehicle having a discharged battery with a charged battery.

Booster cables for use in starting an automotive vehicle having a discharged battery with a charged battery are well-known devices.

In the past, booster cables have generally been constructed of two continuous lengths of insulated wire of a suitable gauge which are terminated at their ends with alligator clips. In use, the cables are attached to the charged and discharged batteries to form a circuit to enable the charged battery, commonly referred to as the good battery, to provide the ignition current and voltage for the discharged battery, commonly referred to as the dead battery. Through the use of booster cables, sometimes referred to as jumper cables, a vehicle with a dead battery can be started using a good battery.

There are, however, many risks attendant with the use of booster cables. First, automotive batteries and ignition systems involve very high DC currents, and as a consequence, there exists a danger of electric shock or burns. Second, automotive batteries contain an electrolyte, commonly known as battery acid, which could lead to an explosion or severe burns. Third, hydrogen gas is produced particularly when the battery is being charged, and as a consequence, if any flame or spark occurs near a battery, the hydrogen gas may ignite resulting in an explosion. The aforementioned risks could not only damage the automobiles but it also might result in injury or death to those people in proximity to the automobiles.

The enumerated risks attendant with the use of booster cables are greatly increased if the booster cables are improperly connected. Improper connection results if the booster cables are attached to the charged battery and the discharged battery without following a specific sequence of steps. Specifically, the procedure is as follows: first, one end of one cable is connected to the positive terminal of the charged battery. Next, the other end of that cable is connected to the positive terminal of the discharged battery. Then, one end of the other cable is connected to the negative terminal of the charged battery. Finally, the other end of the other cable is connected to the negative terminal of the discharged battery or a solid engine ground on the vehicle which houses the discharged battery. If this sequence is followed, there has been a proper connection of the booster cables to the charged and discharged batteries. To start the vehicle having the dead battery without draining the good battery, the engine of the vehicle having the good battery is usually started. Then, the vehicle with the dead battery is started. When both vehicles are running, the booster cables are removed in the reverse order of the connection procedure, with the cable end connected to the negative terminal of the discharged battery or the solid engine ground on the vehicle to be started being detached first. If the booster cables are attached to the terminals of the charged and discharged batteries out of sequence, a conducting path will be established through the booster cables and arcing may occur. Arcing is essentially a spark or flash, and as stated previously, a spark may cause an explosion.

It should also be noted that arcing may occur even if the connections are being made correctly in the proper sequence. Specifically, when the final connection is being made to the negative terminal of the discharged battery, as the clip gets close to the negative terminal, arcing may occur across the short space of air between the terminal and the clip. This type of arcing is a very well known physical phenomenon which could lead to grave injury even though the user was properly employing the booster cables.

An additional risk ensues if accidental connections are made with the booster cables. For example, if one end of a booster cable having a conducting path established therethrough is in contact with the positive terminal of a battery, and the other end of the booster cable is dropped in the engine bay and contacts metal portions of the vehicle, a short circuit may result. The short circuit could cause severe arcing which may significantly damage the cable clip, tools or any metal making contact. As a consequence of the severe arcing, burns or explosions could also result.

The dangers and risks involved when using booster cables are enhanced by the circumstances under which booster cables are usually employed. Most often, booster cables are used in instances best described as roadside emergencies. If available, booster cables are frequently tossed without care into the trunk of a vehicle, very often with the instructions for the proper connection procedure having been discarded. Although the ends of the cables may be properly color-coded, proper identification of the positive and negative terminals is made difficult in poorly lit environments, with poorly marked terminals that have become obscured by age, dirt and grime. These factors make using booster cables an unwieldy and potentially dangerous process.

SUMMARY OF THE INVENTION

It is an object of the present invention to provide a new and improved set of booster cables.

It is another object of the present invention to provide a booster cable system which minimizes the risks attendant with the inadvertent or improper connection of booster cables from a charged battery to a discharged battery.

It is yet another object of the present invention to provide a booster cable system which indicates the state of the connection made to the charged and discharged batteries before the risks attendant with improper connection ensue.

It is still another object of the present invention to provide a booster cable system which can be mass produced and can be very easily used.

According to one feature of the present invention there is provided a booster cable system for use in starting an automotive vehicle having a discharged battery with a charged battery, each battery having a positive terminal and a negative terminal, said booster cable system comprising a first electrical cable having a first end for connection to the positive terminal of the charged battery and a second end, a second electrical cable having a first end for connection to the positive terminal of the discharged battery and a second end, a third electrical cable having a first end for connection to the negative terminal of the charged battery and a second end, a fourth electrical cable having a first end for connection to either the negative terminal of the discharged battery or a ground in the vehicle having the discharged battery and a second end, each electrical cable being insulated, an electrical switch coupled to said four electrical cables, said electrical switch having an open position and a closed position, said electrical switch when closed electrically connecting the second end of said first electrical cable to the second end of said second electrical cable and electrically connecting the second end of said third electrical cable to the second end of said fourth electrical cable, and an electrical clip on the first end of each one of said first, second, third and fourth electrical cables for removably securing the first end of each cable at its intended location.

According to another feature of the present invention, the booster cable system further comprises a first signal indicator circuit coupled between said first electrical cable and said third electrical cable for indicating the state of the connection of the first end of said first and third electrical cables while said electrical switch is in an open position, and a second signal indicator circuit coupled between said second electrical cable and said fourth electrical cable for indicating the state of the connection of the first end of said first and third electrical cables while said electrical switch in an open position.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawing, which is hereby incorporated into and constitutes a part of this specification, illustrates an embodiment of the invention and, together with the description, serves to explain the principles of the invention. In the drawing wherein like reference numerals represent like parts.

DETAILED DESCRIPTION OF A PREFERRED EMBODIMENT

Figure 1:
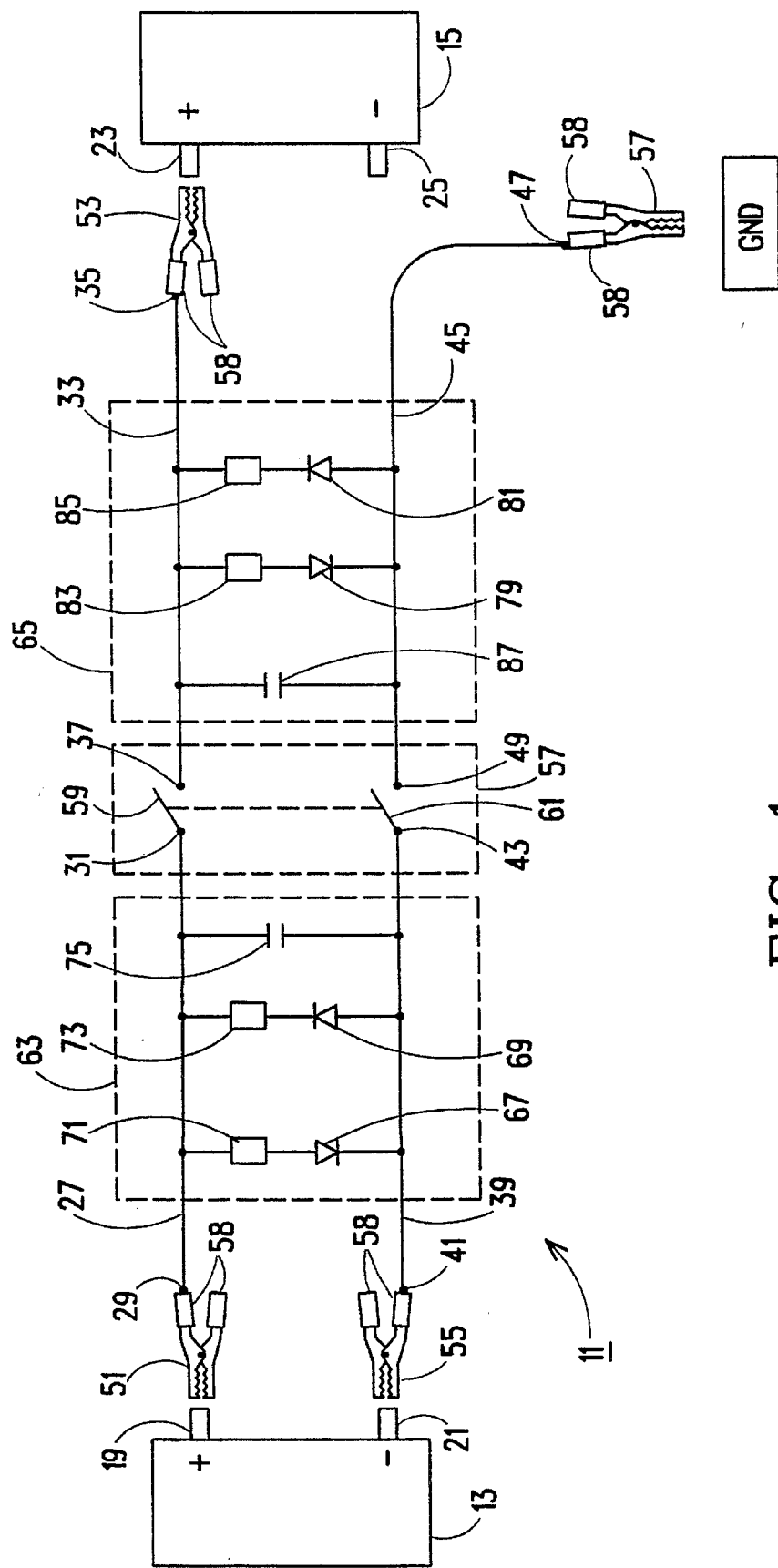
FIG. 1 is a schematic representation of a booster cable system constructed according to the teachings of the present invention, the booster cable system being shown with a charged battery, a discharged battery, and a grounding source.

Referring now to FIG. 1, there is shown a schematic representation of a booster cable system constructed according to the teachings of the present invention, the booster cable system being represented generally by reference numeral 11. Booster cable system 11 may be used to enable a charged battery to provide the ignition current and voltage required to start a discharged battery. So that the use of booster cable system 11 may be clearly understood, FIG. 1 displays booster cable system 11 as well as charged battery 13, discharged battery 15, and a ground GND. It should be noted that ground GND represents any grounding source, including a solid engine ground on the automotive vehicle which houses discharged battery 15. Charged battery 13 includes a positive terminal 19 and a negative terminal 21 and discharged battery 15 includes a positive terminal 23 and a negative terminal 25.

Booster cable system 11 includes a first electrical cable 27 having a first end 29 for connection to positive terminal 19 of charged battery 13 and a second end 31, a second electrical cable 33 having a first end 35 for connection to positive terminal 23 of discharged battery 15 and second end 37, a third electrical cable 39 having a first end 41 for connection to the negative terminal 21 of charged battery 13 and a second end 43, and a fourth electrical cable 45 having a first end 47 for connection to ground GND and a second end 49. It should be noted that first end 47 of electrical cable 45 could be connected to negative terminal 25 of discharged battery 15 rather than to ground GND. Electrical cables 27, 33, 39 and 45 are manufactured of a conductive material, such as a copper electrical cable or wire, which is heavily insulated with a material such as rubber.

Fixedly mounted on ends 29, 35, 41, and 47 are alligator clips 51, 53, 55, and 57, respectively. Alligator clips 51, 53, 55, and 57 are electrical clips constructed of a conductive material. Clips 51, 53, 55, and 57 include insulation material 58 so that they can be held by a user. Clips 51, 53, 55, and 57 serve to removably secure first ends 29, 35, 41 and 47 of cables 27, 33, 39, and 45, respectively, at its intended location.

Booster cable system 11 further includes an electrical switch 57 having an open position and a closed position. When electrical switch 57 is closed, second end 31 of first electrical cable 27 is electrically connected to second end 37 of second electrical cable 33 and second end 43 of third electrical cable 39 is electrically connected to second end 49 of fourth electrical cable 45. Electrical switch 57 is a double pole single throw (DPST) switch comprised of a first single pole single throw (SPST) switch 59 mechanically ganged together with a second single pole single throw (SPST) switch 61. It should be noted that electrical switch 57 is located at a point on cables 27, 33, 45, and 39 away from clips 51, 53, 55, and 57 so that a conducting path is established away from batteries 13 and 15 because most hazards associated with sparks and arcing occur if the conducting path is established near batteries 13 and 15.

While electrical switch 57 is in the open position, a conducting path can not be established from charged battery 13 through booster cable system 11 to discharged battery 15 and ground GND. Rather, a conducting path can only be established when electrical switch 57 is in the closed position. Opening electrical switch 57 prevents any conducting path from being established through any of cables 27, 33, 39, and 45, under all circumstances. As a result, no matter how cables 27, 33, 39, and 45 are attached or no matter how they fall, the dangers of arcing are completely eliminated because as long as the switch is open, there is no possibility that a conducting path can be established between any of terminals 19, 21, 23, and 25 of batteries 13 and 15, which is a necessary precondition for arcing.

Booster cable system 11 further includes a first signal indicator circuit 63 for indicating the state of the connection of first end 29 of first electrical cable 27 and first end 41 of third electrical cable 39 while electrical switch 57 is in an open position, and a second signal indicator circuit 65 for indicating the state of the connection of first end 35 of second electrical cable 33 and first end 47 of fourth electrical cable 45 while electrical switch 57 is in an open position. First signal indicator circuit 63 is coupled between first electrical cable 27 and third electrical cable 39. Second signal indicator circuit 65 is coupled between second electrical cable 33 and fourth electrical cable 45.

Signal indicator circuits 63 and 65 are used to indicate the state of the connection made by booster cable system 11 to batteries 13 and 15 and ground GND while electrical switch 57 is open and while booster cable system lacks a conducting path therethrough which avoids the dangers of arcing and short circuits. Once the connections are determined to be proper, switch 57 can be closed and a conducting path can be established through booster cable system 11. In a proper connection of booster cable system 11 to batteries 13 and 15 and ground GND, a conducting path is established from positive terminal 19 to positive terminal 23 through either cables 27 and 33 or cables 39 and 45. Similarly, in a proper connection of booster cable system 11 to batteries 13 and 15 and ground GND, a conducting path is established from negative terminal 21 to ground GND through cables 27 and 33 or cables 39 and 45, whichever pair of cables that is not used to connect positive terminals 19 and 23. If cables 27, 33, 39 and 45 are improperly connected to batteries 13 and 15 and ground GND, the hazards of arcing, fire, explosion, and electric shock become prevalent.

First signal indicator circuit 63 includes a green light emitting diode (LED) 67 and a red light emitting diode (LED) 69 connected in reverse parallel, with one end of diodes 67 and 69 being connected to first electrical cable 27 between first end 29 and second end 31 and the other end of diodes 67 and 69 being connected to third electrical cable 39 between first end 41 and second end 43. Diodes 67 and 69 are connected to cables 27 and 39 such that green LED 67 is forward biased from cable 27 to cable 39 and red LED 69 is reverse biased from cable 27 to cable 39. First signal indicator circuit 63 further includes a first resistor 71 connected in series with green LED 67 which serves as a resistive load for dissipating some of the incident power which could potentially overload green LED 67, a second resistor 73 connected in series with red LED 69 which serves as a resistive load for dissipating some of the incident power which could potentially overload red LED 69, and a capacitor 75 connected in parallel with LEDs 67 and 69 which absorbs transient currents and voltages created when switch 57 is initially closed.

Second indicator circuit 65 includes a green light emitting diode (LED) 79 and a red light emitting diode (LED) 81 connected in reverse parallel, with one end of diodes 79 and 81 being connected to second electrical cable 33 between first end 35 and second end 37 and the other end of diodes 59 and 61 being connected to fourth electrical cable 45 between first end 47 and second end 49. Diodes 79 and 81 are connected to cables 33 and 45 so that green LED 79 is forward biased from cable 33 to cable 45 and red LED 81 is reverse biased from cable 33 to cable 45. Second indicator circuit 57 further includes a first resistor 83 connected in series with green LED 79 which serves as a resistive load for dissipating some of the incident power which could potentially overload green LED 79, a second resistor 85 connected in series with red LED 81 which serves as a resistive load for dissipating some of the incident power which could potentially overload red LED 81, and a capacitor 87 connected in parallel with LEDs 79 and 81 which absorbs transient currents and voltages created when switch 57 is initially closed.

Booster cable system 11 can be used in the following manner: First, electrical switch 57 is switched into the open position if it is not already open. Next, clip 51 of first electrical cable 27 is attached to positive terminal 19 of charged battery 13. Clip 53 of second electrical cable 33 is attached to positive terminal 23 of discharged battery 15. Clip 55 of third electrical cable 39 is attached to negative terminal 21 of charged battery 13. Clip 57 of fourth electrical cable 45 is attached to ground GND. Once, clips 51, 53, 55 and 57 have been connected to batteries 13 and 15 and ground GND, first and second signal indicator circuits 63 and 65 will visually indicate the state of the connections made. It should be noted that circuits 63 and 65 will indicate the state of the connections made while switch 57 is open and, as a consequence, while there is no conducting path established throughout booster cable system 11.

If clip 51 is attached to positive terminal 19 and clip 55 is attached to negative terminal 21, a positive voltage and current will pass from first electrical cable 27 to third electrical cable 39 through green LED 67. The voltage and current will cause green LED 67 to illuminate, thereby signifying connection of clips 51 and 55 to terminals 19 and 21, respectively. If clip 51 is attached to negative terminal 21 and clip 55 is attached to positive terminal 19, a positive voltage and current will pass from third electrical cable 39 to first electrical cable 27 through red LED 69. The voltage and current will cause red LED 69 to illuminate, thereby signifying connection of clips 51 and 55 to terminals 21 and 19, respectively.

Similarly, if clip 53 is attached to positive terminal 23 and clip 57 is attached to ground GND, a positive voltage and current will pass from second electrical cable 33 to fourth electrical cable 45 through green LED 79. The voltage and current will cause green LED 79 to illuminate, thereby signifying a connection of clips 53 and 57 to terminal 23 and ground GND, respectively. If clip 53 is attached to ground GND and clip 57 is attached to positive terminal 23, a positive voltage and current will pass from fourth electrical cable 45 to second electrical cable 33 through red LED 81. The voltage will cause red LED 81 to illuminate, thereby signifying connection of clips 53 and 57 to terminals 25 and 23, respectively.

It must be noted that if both green LEDs 67 and 79 are illuminated, then booster cable system 11 has been properly connected to batteries 13 and 15 and ground GND. Similarly, it must be noted that if both red LEDs 69 and 81 are illuminated, then booster cable system 11 has been properly connected to batteries 13 and 15 and ground GND. However, if there is either a combination of green LED 67 and red LED 81 or red LED 69 and green LED 79 illuminated, this signifies an improper connection of booster cable system 11 to batteries 13 and 15 and ground GND. In such a circumstance, clips 51, 53, 55 and 57 must be reattached to batteries 13 and 15 and ground GND until these two LED illumination combinations are eliminated. These two combinations signify that a conducting path has been established from positive terminal 19 to ground GND and negative terminal 21 to positive terminal 23 which could lead to a short circuit, arcing, or potentially an explosion upon the closing of switch 57.

Once circuits 63 and 65 indicate the state of the connection of booster cable system 11 to batteries 15 and 15 and ground GND is proper, switch 57 is closed. Upon closure of switch 57, the engine of the vehicle having the battery that is providing the jump start is preferably started. Finally, the engine of the vehicle with discharged battery 15 is started. Once the vehicle with discharged battery 15 is started, switch 57 is opened and booster cable system 11 is removed in the reverse sequence of connection, pending further use.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A booster cable system for use in starting an automotive vehicle having a discharged battery with a charged battery, each battery having a positive terminal and a negative terminal, said booster cable system comprising:

a. a first electrical cable having a first end for connection to the positive terminal of the charged battery and a second end;

b. a second electrical cable having a first end for connection to the positive terminal of the discharged battery and a second end;

c. a third electrical cable having a first end for connection to the negative terminal of the charged battery and a second end;

d. a fourth electrical cable having a first end for connection to either the negative terminal of the discharged battery or a ground in the vehicle having the discharged battery, said fourth electrical cable also having a second end;

e. each electrical cable being insulated;

f. an electrical switch coupled to said four electrical cables, said electrical switch having an open position and a closed position, said electrical switch, when closed, electrically connecting the second end of said first electrical cable to the second end of said second electrical cable and electrically connecting the second end of said third electrical cable to the second end of said fourth electrical cable; and g. an electrical clip on the first end of each one of said first, second, third and fourth electrical cables for removably securing the first end of each electrical cable at its intended location.

2. The booster cable system for use in starting an automotive vehicle as claimed in claim 1, wherein said electrical switch is a double throw single pole switch, said double throw single pole switch, while open, preventing any conducting path from being established between any of said electrical cables, intentionally or accidentally, until said switch is closed.

3. The booster cable system for use in starting an automotive vehicle as claimed in claim 2, wherein said electrical clips are alligator clips.

4. The booster cable system as claimed in claim 3, wherein said electrical switch is positioned at a point along said first, second, third, and fourth electrical cables away from said electrical clips so that the electrical path established when said electrical switch is closed is made away from the charged battery and the discharged battery, thereby eliminating the hazards associated with sparks or arcing which occur when a conducting path is established near the charged battery and the discharged battery.

5. The booster cable system as claimed in claim 1, further comprising a first signal indicator circuit coupled between said first electrical cable and said third electrical cable for indicating the state of the connection of the first end of said first and third electrical cables while said electrical switch is in an open position.

6. The booster cable system as claimed in claim 5, further comprising a second signal indicator circuit coupled between said second electrical cable and said fourth electrical cable for indicating the state of the connection of the first end of said second and fourth electrical cables while said electrical switch in an open position.

7. The booster cable system as claimed in claim 5, wherein said first signal indicating circuit includes a first light emitting diode connected so as to give out a signal when the first end of said first and third electrical cables is connected to the positive and negative terminals, respectively, of said charged battery.

8. The booster cable system as claimed in claim 7, wherein said first signal indicating circuit further includes a second light emitting diode connected so as to give out a signal when the first end of said first and third electrical cables is connected to the negative and positive terminals, respectively, of said charged battery.

9. The booster cable system as claimed in claim 6, wherein said second signal indicating circuit includes a first light emitting diode connected so as to give out a signal when the first end of said second and fourth electrical cables is connected to the positive terminal of said discharged battery and ground in said vehicle, respectively.

10. The booster cable system as claimed in claim 9, wherein said second signal indicating circuit further includes a second light emitting diode connected so as to give out a signal when the first end of said second and fourth electrical cables is connected to the positive terminal of said discharged battery and ground, respectively.

* * * * *